United States Patent
Marshall

(10) Patent No.: US 12,392,138 B2
(45) Date of Patent: Aug. 19, 2025

(54) ARTICLE AND METHOD FOR ENCLOSING APERTURE IN HOUSE SIDING TO PREVENT OR DISCOURAGE ENTRY BY SMALL ANIMALS AND INSECTS

(71) Applicant: John Marshall, Tallmadge, OH (US)

(72) Inventor: John Marshall, Tallmadge, OH (US)

(73) Assignee: John Marshall, Tallmadge, OH (US)

( * ) Notice: Subject to any disclaimer, the term of this patent is extended or adjusted under 35 U.S.C. 154(b) by 104 days.

(21) Appl. No.: 18/150,844

(22) Filed: Jan. 6, 2023

(65) Prior Publication Data

US 2024/0076879 A1    Mar. 7, 2024

Related U.S. Application Data

(60) Provisional application No. 63/297,464, filed on Jan. 7, 2022.

(51) Int. Cl.
*E04F 13/073* (2006.01)
*A01M 29/30* (2011.01)

(52) U.S. Cl.
CPC ......... *E04F 13/0733* (2013.01); *A01M 29/30* (2013.01); *E04F 2290/00* (2013.01)

(58) Field of Classification Search
CPC .................................................. E04F 13/0733
See application file for complete search history.

(56) References Cited

U.S. PATENT DOCUMENTS

| | | | | |
|---|---|---|---|---|
| 2,110,258 A | * | 3/1938 | Blank | E04D 1/29 |
| | | | | D25/139 |
| 2,360,052 A | * | 10/1944 | Fuller | E04F 19/024 |
| | | | | 52/276 |
| 2,970,678 A | * | 2/1961 | Brinen | F24D 19/04 |
| | | | | 285/284.1 |
| 2,993,306 A | * | 7/1961 | Persons | E04F 13/0864 |
| | | | | 52/62 |
| 3,204,373 A | * | 9/1965 | Small | E04H 1/12 |
| | | | | 52/282.5 |
| 3,651,610 A | * | 3/1972 | Donahue | E04F 13/0864 |
| | | | | 52/278 |
| 4,998,947 A | * | 3/1991 | Dostall | E04F 19/024 |
| | | | | 52/287.1 |
| 4,999,961 A | * | 3/1991 | McNary | E04F 19/024 |
| | | | | 52/287.1 |
| 6,311,442 B1 | * | 11/2001 | Watanabe | E04F 19/022 |
| | | | | 52/282.1 |
| 7,228,665 B2 | * | 6/2007 | Perry | E04F 13/0864 |
| | | | | 52/287.1 |

(Continued)

*Primary Examiner* — Joshua K Ihezie

(57) ABSTRACT

This invention relates to an apparatus for obstructing the open end of vertical corner channel pieces of siding often used in residential building applications. Siding terminates at the corners of buildings into a vertical corner channel piece that is typically open on its top and bottom ends. This opening provides opportunity for small animals to enter and damage the building. This invention comprises an enclosing cap with a bottom surface to obstruct the opening of the vertical corner channel piece and two exterior surfaces along with two interior pinching surfaces that secure the apparatus onto the siding piece. This enclosing cap provides an attractive and inexpensive solution to the problem of small animals entering spaces located underneath siding.

1 Claim, 5 Drawing Sheets

(56) References Cited

U.S. PATENT DOCUMENTS

| | | | | |
|---|---|---|---|---|
| 7,591,118 | B2* | 9/2009 | Shaw | E04D 13/15 |
| | | | | 52/312 |
| 11,464,223 | B1* | 10/2022 | Stouffer | E04F 13/12 |
| 2003/0033771 | A1* | 2/2003 | Anderson | E04F 13/0864 |
| | | | | 52/312 |
| 2003/0159380 | A1* | 8/2003 | Doucet, Sr. | E04F 19/028 |
| | | | | 52/287.1 |
| 2007/0119107 | A1* | 5/2007 | Shaw | E04D 13/15 |
| | | | | 52/287.1 |
| 2016/0376829 | A1* | 12/2016 | Davis | E04F 19/028 |
| | | | | 52/211 |
| 2018/0135308 | A1* | 5/2018 | Houser | E04F 13/0733 |
| 2024/0076879 | A1* | 3/2024 | Marshall | E04F 13/18 |

\* cited by examiner

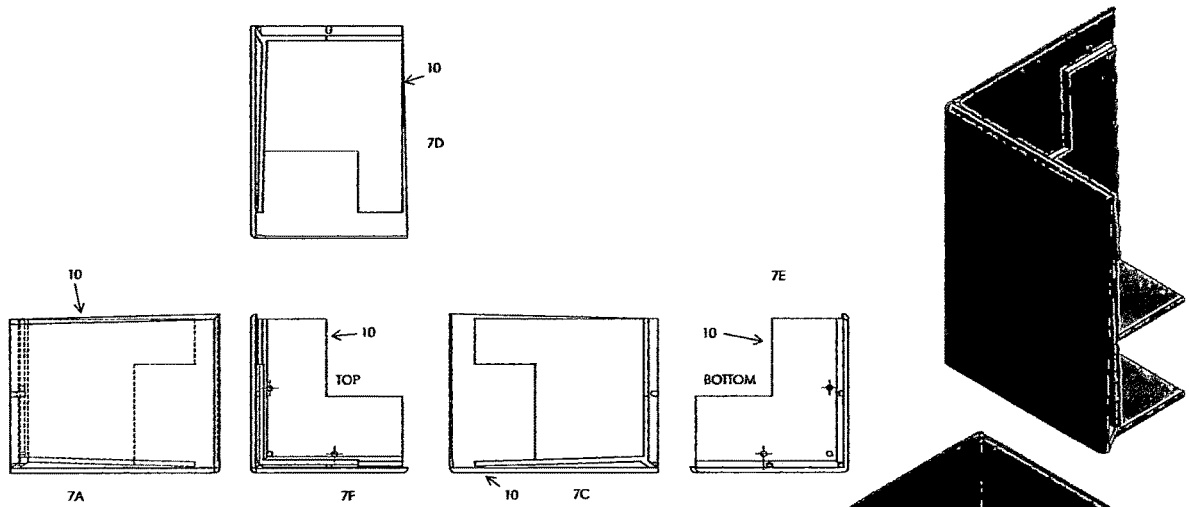
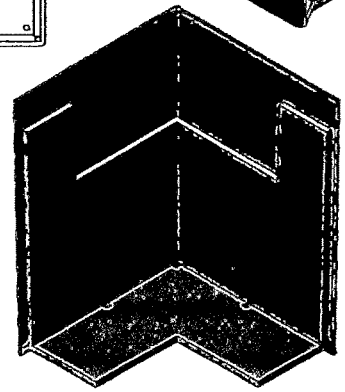
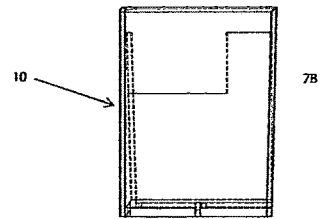
FIG. 5
FIG. 6
FIG. 7

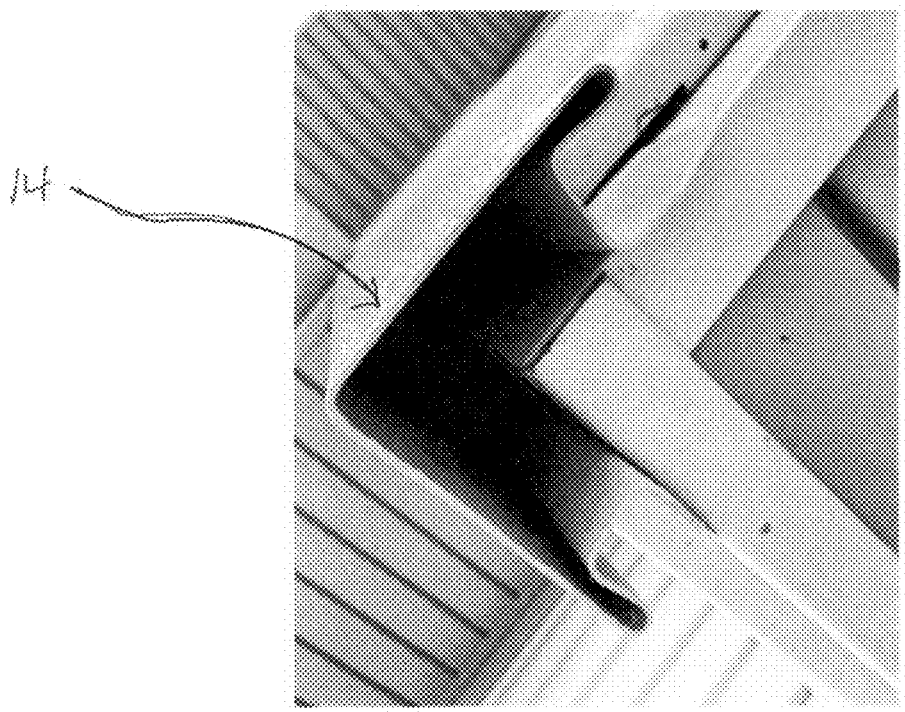
FIG. 8
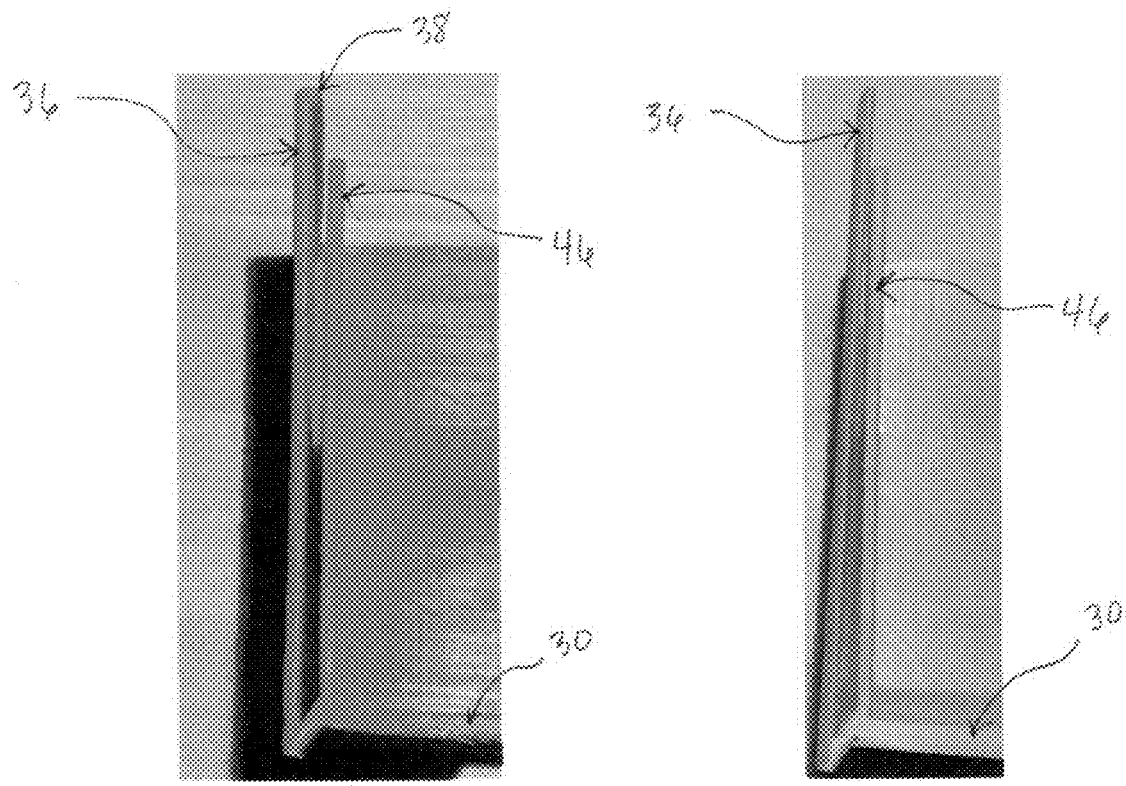
FIG. 9
FIG. 10

ARTICLE AND METHOD FOR ENCLOSING APERTURE IN HOUSE SIDING TO PREVENT OR DISCOURAGE ENTRY BY SMALL ANIMALS AND INSECTS

I. CROSS-REFERENCE TO RELATED APPLICATION(S)

This application claims the benefit of U.S. Provisional Patent Application No. 63/297,464, filed Jan. 7, 2022, which is incorporated by reference herein in its entirety.

II. BACKGROUND

A. Field of the Invention

This invention generally relates to methods and apparatuses related to siding, such as aluminum or vinyl siding often used to encase a residential home, although the invention is applicable to structures other than residential homes and materials other than vinyl or aluminum siding.

B. Description of Related Art

It is known to create structures, such as residential homes and commercial buildings, with different building materials. One of those types of building materials is wood. However, wood needs to be painted and often does not stand up to harsh weather. In recent years, a building option of wood or other material is used to function a wall which is then covered with siding, often made out of thin sheets of aluminum or vinyl or other plastics. Generally, the siding is constructed in long, rectangular, aesthetically corrugated strips that are hooked together and fitted in a generally horizontal orientation, where the vertical measurement of the siding is far less than the horizontal. These strips are stacked vertically and overlapped along the horizontal length to form the external protective barrier of the wall. At the corners of these exterior walls, the horizontal strips terminate within a separate, vertically oriented corner channel siding piece, also made of a particularly shaped thin sheet of similar material to the horizontal strips, that hides the cut ends of the horizontal strips and provides an aesthetic division between the walls of horizontal siding.

Numerous advantages of such siding have been realized, including cost of materials, cost of installation, and low maintenance requirements. However, the siding tends to be of a corrugated shape that includes an air pocket or interior space which, if accessed by certain elements or wildlife, can create problems. For example, small animals, such as squirrels and mice, can access this interior space and, finding it warm and pleasant for a home, damage the structure and integrity of the wall, creating difficulty and expense for the homeowner. The vertical corner channels are open at the ends and can provide access to the air pockets and interior spaces behind the siding and within the corner channel itself.

What is needed is an inexpensive and attractive cap or closure which assists and enables a building contractor or homeowner to seal the ends of vertical corner channel siding pieces from animals and the like. This invention will provide numerous other advantages as will be readily understood by a person of skill in the art.

III. SUMMARY

In accordance with the teachings of this invention, one embodiment relates to a single piece of material shaped into a cap so that it can be slid onto the end of a corner channel. The cap comprises two flat rectangular side wall features that slide onto the outside of the vertical corner channel and a bottom horizontal plate feature that provides a "stop" to the cap as it slides onto the corner channel and obstructs, but does not tightly seal, the opening at the end of the corner channel in order to prevent entry by small animals. This embodiment of the invention is secured to the corner channel by pinching the inner and outer surfaces of the channel between the exterior side walls of the cap and parallel vertical plates positioned interior to the corner channel. The pinch force placed on the corner channel surfaces by the cap is controlled by the spacing between the interior and exterior walls and the rigidity of the material of which the cap is made.

In a further embodiment of this invention, the top edges of the exterior walls bend or curve slightly inward to increase the pinch force on the corner channel surfaces, more firmly securing the cap to the corner channel.

In a further embodiment of this invention, the interior side walls angle toward the exterior side walls, rather than merely parallel to the exterior side walls, so as to increase the pinch force on the surfaces of the corner channel siding piece and more firmly secure the cap.

In a further embodiment of this invention, the exterior side walls may be shaped to more closely match the exterior surface of the corner channel siding piece, which would improve the aesthetics of the invention and create a tighter fit with the corner channel piece, more firmly securing the cap to the corner channel piece.

In a further embodiment of this invention, small holes are included through the bottom plate to allow for drainage of water through the cap when installed while still preventing the entry of small animals into the interior of the corner channel siding piece.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 5 is a perspective, schematic view of an article according to the invention.

FIG. 6 is a schematic, perspective view of an article according to the invention, with the same article as shown in FIG. 5 but rotated approximately ninety degrees.

FIG. 7 is a series of six views of the article, such as would be appropriate for machine drawing. FIG. 7A is a side view as is FIG. 7C, while FIGS. 7B and 7D are also side views from different perspectives. FIG. 7E is a bottom view of the invention and FIG. 7F is a top view of the invention.

FIG. 8 is a photograph of the lower end of a typical vertical corner channel siding piece in a typical installation on a residential home without the invention in place.

FIG. 9 is a photograph of a side view of one embodiment of the invention.

FIG. 10 is a photograph of the same side view of a different embodiment of the invention.

Figure 11:
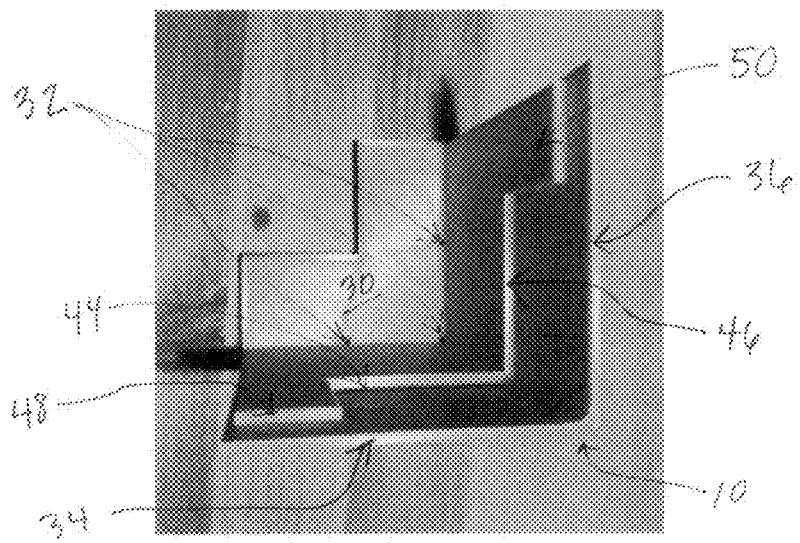

FIG. 11 is a photograph of the top view of the second embodiment of the invention.

Figure 12:
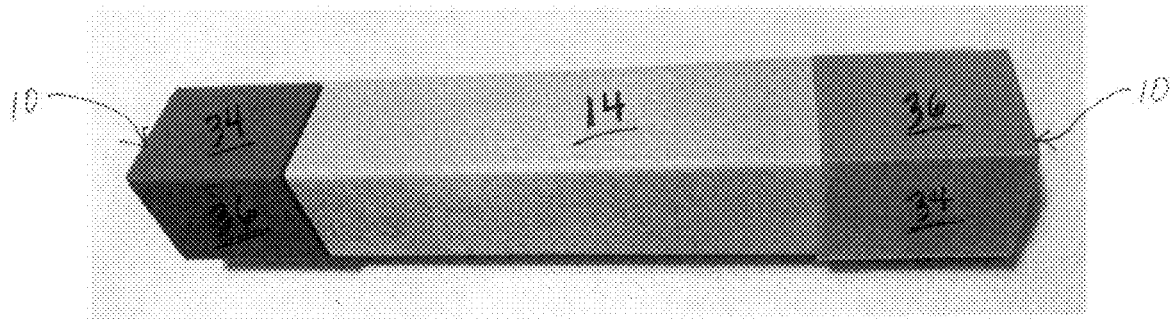
Figure 13:
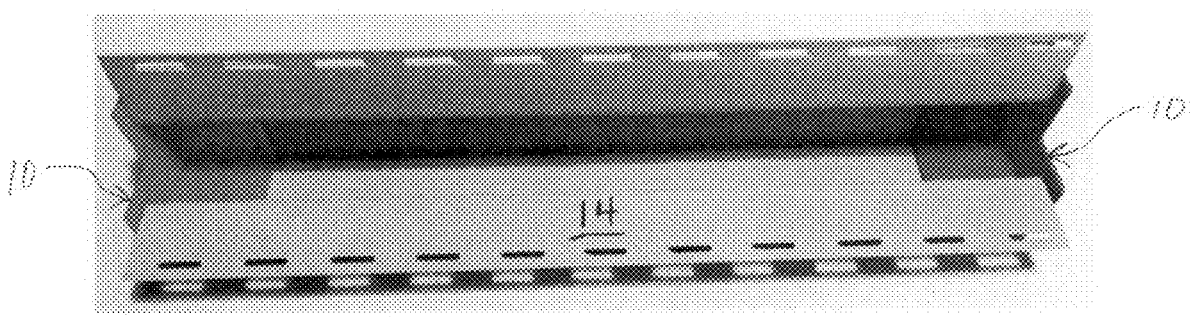

FIGS. 12 and 13 are photographs of two different embodiments of the invention installed on a short piece of corner channel siding that has not been installed on a building in order to show how the invention fits onto the corner channel piece.

V. DETAILED DESCRIPTION

Referring now to the drawings wherein the showings are for purposes of illustrating the embodiments of the invention only and not for purposes of limiting the same, and wherein like reference numerals are understood to refer to like components, FIGS. 1 through 7 show an article 10 according to the invention.

The article 10 or cap 10 is shown installed at the lower end of vertical corner channel 14. The numerous stacked pieces of horizontally disposed siding 12 terminate within vertical corner channel 14.

Figure 1:
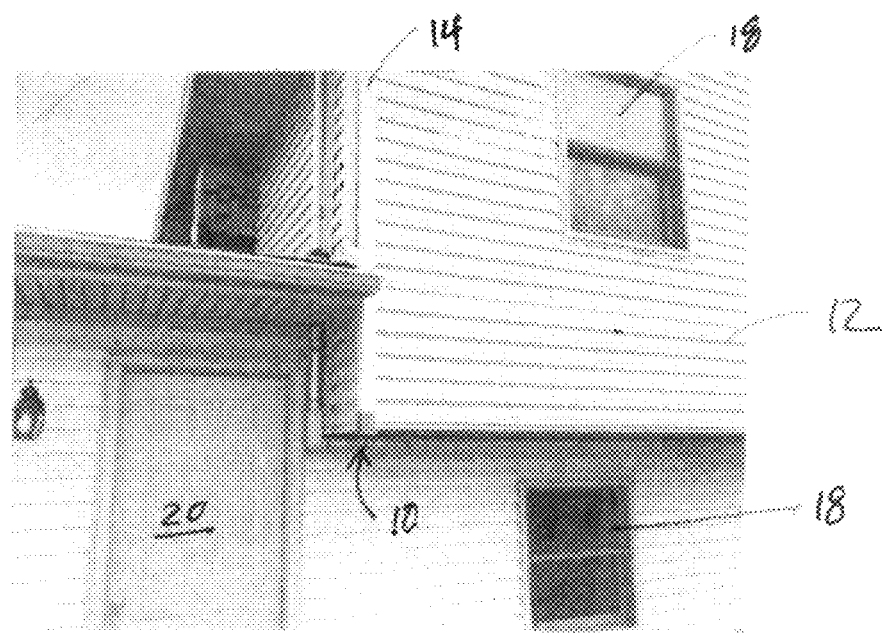
FIG. 1 is a perspective view of the inventive article in place on a residential house featuring horizontal and vertically disposed siding where the article is shown capping the bottom of a run of vertical corner channel.

With continuing reference to FIG. 1, a typical residential home is shown with windows 18 and a door 20.

Figure 2:
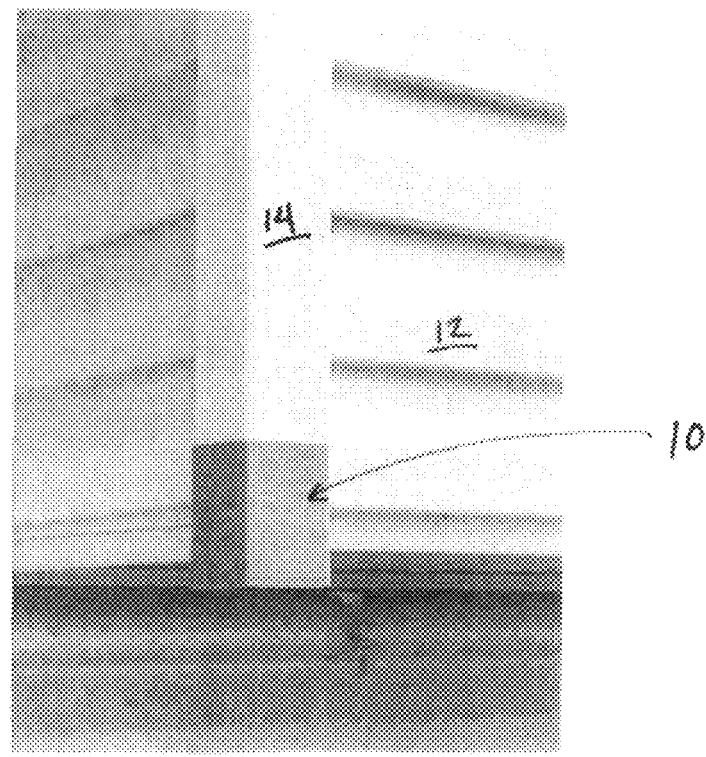
FIG. 2 is a close up of the article shown in FIG. 1.

With continuing reference to FIGS. 1 and 2, FIG. 2 provides a close up of the cap 10 in place on a vertical corner channel 14.

Figure 3:
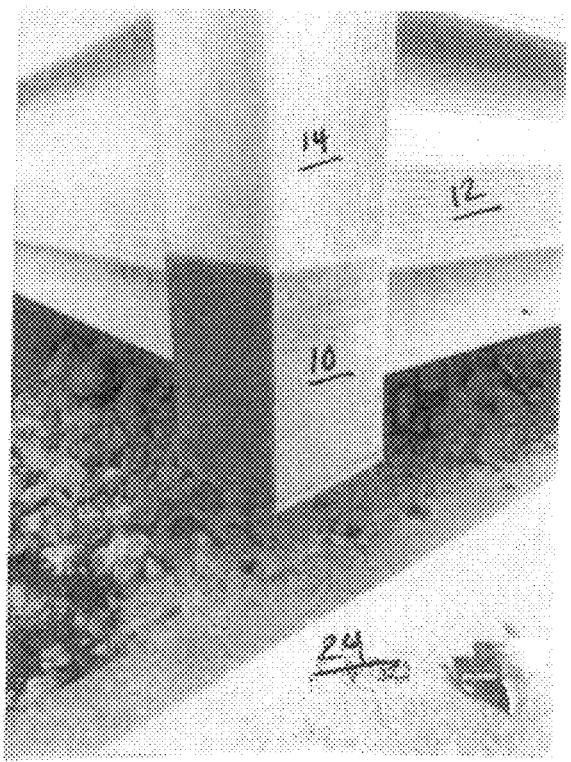
FIG. 3 is a perspective view of an alternate embodiment of an article according to the invention where the article is mounted at the lower end of a vertical corner channel and is near the ground level of the building.
Figure 4:
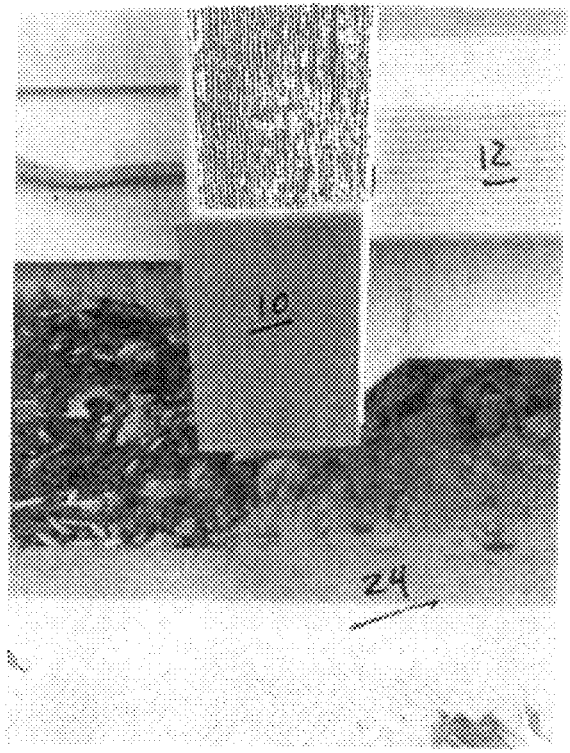
FIG. 4 is a side view of an alternate embodiment of an article according to the invention where the article is mounted on the lower end of a vertical corner channel piece of siding and is near the ground level of the building.

With reference to FIGS. 3 and 4, a perspective and front view of a cap 10 according to the invention is shown. In this embodiment, the vertical corner channel 14 terminates just above the associated ground 24 thereby making it especially simple for small animals, such as mice, to enter into the chamber formed by the interior of the vertical corner channel 14. The cap 10 is helpful to close off this opening and prevent such small animals from entering. With reference now to FIGS. 5 and 6, an embodiment of the cap 10 is shown. With reference to FIG. 5, the "top" of the cap 10 is open but with reference to FIG. 6, the "bottom 28" of the cap is closed via surface 30. The bottom 28 is behind or on the backside of surface 30. The cap 10 features first and second side walls 34, 36.

With continuing reference to FIGS. 7A-7F, each orientation of the inventive device is illustrated.

With continuing reference to FIGS. 1-7, the benefits of the inventive article or cap 10 will now be described. First, it primarily acts as an effective barrier to rodents, bugs and insects, and other pests. With reference to FIG. 8, an end view of the vertically extending corner channel piece, such as that shown in FIGS. 3 and 4, is illustrated. This end view is shown without the inventive cap 10 so that the channel is shown. This interior channel is attractive to small rodents, insects, bugs, and other pests who enjoy traveling and living within such channel. Although it is known to provide a cap that slides into the siding corner channel piece, that cap does not close off the channel. Rather, it simply provides a decorative rounded end to the edges of the channel. The inventive article 10 not only provides the rounded edges which are desirable, but it also provides the floor or surface 30 to obstruct the interior of the channel.

With reference to FIG. 9, one embodiment of the invention is shown with the interior side wall 46 oriented parallel to the exterior side wall 36. This view also shows a "lip" feature 38 comprising a small bend or curve in the top end of the exterior side wall 36.

With reference to FIG. 10, another embodiment of the invention is shown with the interior side wall 46 oriented at an angle toward the exterior side wall 36. This view shows no "lip" feature in exterior side wall 36.

With reference to FIG. 11, an embodiment of the invention 10 is shown from the top view. This view shows the first exterior side wall 34 and the second exterior side wall 36 protruding from the horizontal bottom plate 30. This embodiment includes small holes 32 in the bottom plate to provide drainage when installed. Also shown are the first interior side wall 44 and second interior side wall 46, including their elongated "tab" features 48, 50 that increase pinch force on the corner channel siding piece.

With reference to FIG. 12, two separate embodiments 10 are shown installed on the ends of a short corner channel siding piece 14 from an exterior view, which is visible when the corner channel siding piece is installed on a building. Also shown are the first exterior side wall 34 and the second exterior side wall 36 of the invention 10 that show the orientation of each embodiment.

With reference to FIG. 13, two separate embodiments 10 are shown installed on the ends of a short corner channel siding piece 14 from an interior view. This surface of the corner channel piece 14 is against the building when installed and cannot be seen.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

1. An enclosing cap for a siding corner channel comprising:
   a horizontally disposed bottom plate having a shape that includes at least one right angle connecting two adjacent straight edges;
   a first pair of exterior vertical side walls protruding at right angles to the bottom plate along the adjacent straight edges and connected at a right angle to one another;
   a second pair of interior vertical side walls protruding from the bottom plate and positioned interior and generally parallel to the first pair of exterior vertical side walls so as to pinch the siding corner channel between the pairs of vertical walls;
   wherein the second pair of interior vertical side walls are oriented each at a slight angle toward the first pair of exterior vertical side walls so as to increase the pinch force on the siding corner channel;
   wherein the second pair of interior vertical side walls are shaped with an elongated portion along lateral edges of the second pair of interior vertical side walls extending upward away from the bottom plate so as to create an area of increased pinch force on the siding corner channel between the interior and exterior vertical side walls;

wherein the first pair of exterior vertical side walls extend down beyond the bottom plate;
further comprising at least one small hole in the bottom plate to allow drainage; and
wherein the cap comprises plastic.

\* \* \* \* \*